(Model.)
J. B. WHITEMAN.
GATE.
No. 290,509. Patented Dec. 18, 1883.
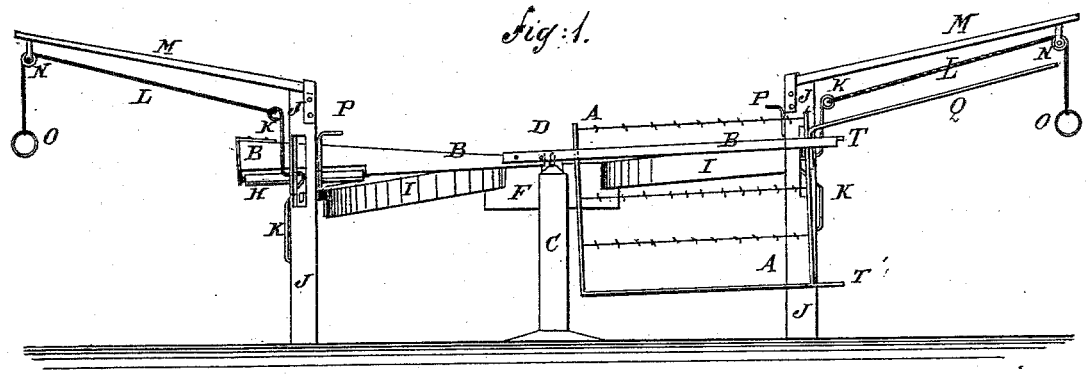
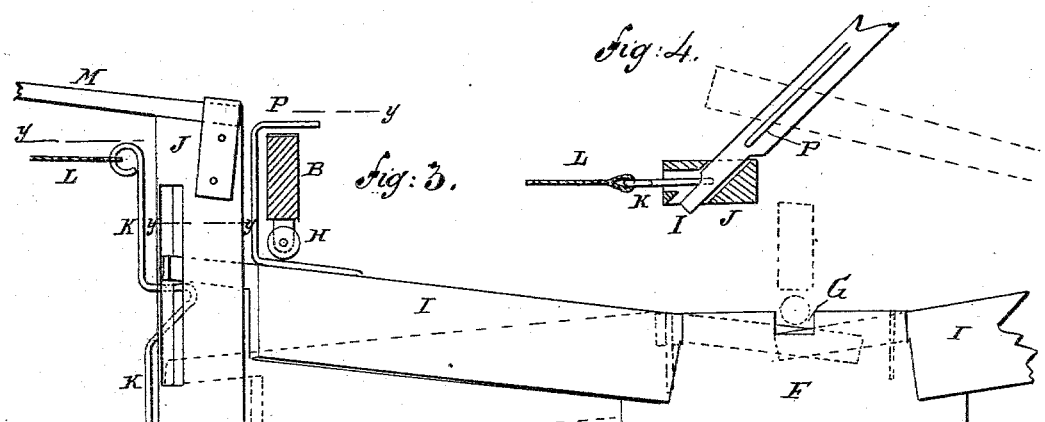
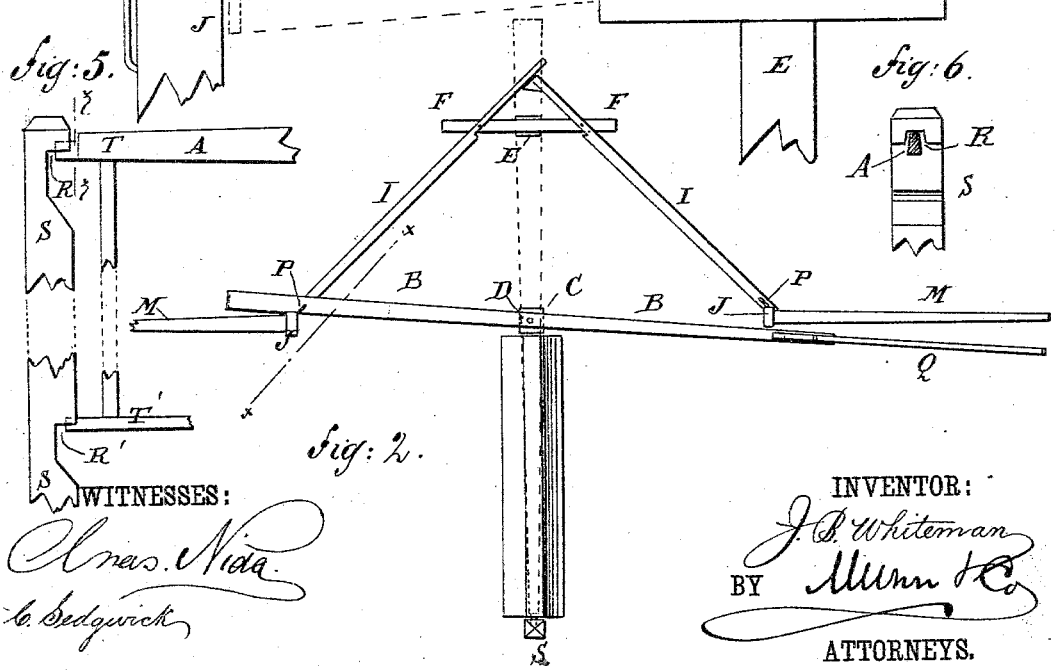
WITNESSES:
INVENTOR:
J. B. Whiteman
BY Munn & Co
ATTORNEYS.

UNITED STATES PATENT OFFICE.

JOHN BLACKBURN WHITEMAN, OF CENTERVILLE, OREGON.

GATE.

SPECIFICATION forming part of Letters Patent No. 290,509, dated December 18, 1883.

Application filed July 12, 1883. (Model.)

*To all whom it may concern:*

Be it known that I, JOHN BLACKBURN WHITEMAN, of Centerville, in the county of Umatilla and State of Oregon, have invented a new and useful Improvement in Gates, of which the following is a full, clear, and exact description.

Reference is to be had to the accompanying drawings, forming a part of this specification, in which similar letters of reference indicate corresponding parts in all the figures.

Figure 1 is a front elevation of my improved gate, shown open. Fig. 2 is a plan view of the same. Fig. 3 is a front elevation of a part of the same enlarged, the top bar of the gate being shown in section through the line $x\,x$, Fig. 2. Fig. 4 is a sectional plan view of a part of the same, taken through the line $y\,y\,y\,y$, Fig. 3. Fig. 5 is a side elevation of the latch-post and latches of the gate. Fig. 6 is a front elevation of the upper part of the latch-post, the latch being shown in section through the line $z\,z$, Fig. 5.

The object of this invention is to facilitate the opening and closing of gates by persons on horseback or in vehicles.

The invention consists in a gate constructed with a long rearwardly-projecting weighted top bar pivoted to a supporting-post and resting upon a recessed cross-bar, to which are pivoted two tilting bars having their forward ends inserted in slotted side posts provided with spring-catches to support the said tilting bars when raised, the spring-catches being provided with trip-cords supported by bars attached to the side posts, so that the gate can be opened by operating one of the said trip-cords to lower the forward end of a tilting bar.

To the tilting bars are attached bent rods for the weighted top bar of the gate to engage with and raise the tilting bars when the forward end of the gate is lowered by means of a lever attached to its upward forward corner.

To lugs attached to the rearwardly-projecting weighted top bar of the gate is pivoted a roller to cause the said bar to move easily down the inclined tilting bars. The forward end of the gate is provided with rigid latches to engage with recessed shoulders upon the latch-post and fasten the gate shut, as will be hereinafter fully described.

A represents the gate, which may be made with an iron frame attached to a wooden top bar or beam, B, and provided with barbed horizontal wires, or of any other suitable material or construction.

C is the rear or hinge gate-post, to the upper end of which is attached a pivot, D, to enter a socket in the top bar or beam, B, a little in the rear of the rear upright bar of the gate A. The top bar, B, is made of such a length that the pivot D will be at or near its center, and its rear part is made of such a weight or is so weighted as to overbalance the gate.

In the rear of the post C, and at a distance therefrom about equal to the width of the roadway, is placed a post, E, to the upper end of which is attached a cross-bar, F, having in the center of its upper edge a notch, G, of sufficient width to receive the top bar, B, or a friction-roller, H, pivoted to lugs attached to the lower edge of the said top bar, B.

In recesses in the end parts of the upper edge of the cross-bar F are pivoted two bars, I, the rear ends of which meet in the rear of the post E, and beneath the rear edge of the top bar, B, when the gate A is closed. The forward ends of the bars I, or arms formed upon or attached to the said ends, enter vertical slots in the side posts, J, placed at the opposite sides of the hinge-post C, and at a distance from the said post about equal to the length of the gate A.

To the outer side of each post J is attached the lower end of a spring, K, which is made with a projection having an inclined lower side and a square upper side to enter a slot in the post J, and cross the end or arm of the bar I, so that when the said end or arm is raised it will push back the spring K and pass the projection of the said spring and rest upon its square shoulder.

To the upper end of each spring-catch K is attached the end of a cord, L, which passes along the under side of a bar, M, attached at one end to the top of the post J, and projecting along the side of the roadway. The cord L passes over a pulley, N, pivoted to supports attached to the lower side of the outer end of the bar M, and to its free end is attached a ring, O, a tassel, or other weight of sufficient gravity to keep the said cord taut, and which serves as a handle when operating the said cord.

To the upper side of each bar I, at the rear side of the post J, is attached a rod, P, which projects upward and is bent to the rearward, as shown in Figs. 1 and 3, so as to receive beneath its upper end the top bar, B, when the gate is opened.

To the upper forward corner of the gate A is attached the end of a bar, Q, which projects forward in the plane of the said gate A, as shown in Fig. 2. The forward end, T, of the top bar, B, projects in front of the front end bar of the gate A, so as to enter a recess in a shoulder, R, formed in the inner side of the latch-post S, to hold the gate shut. The gate, when shut, is still further secured in place by having an arm, T', attached to or formed upon its lower forward corner, to engage with a recessed shoulder, R', formed upon the lower part of the post S. With this construction, when the gate is shut and a man on horseback or in a vehicle approaches the gate, he pulls upon the cord L, which draws back the spring-catch K and allows the forward end of the bar I upon that side of the gate to drop downward into an inclined position. This movement of the bar I raises the bar B out of the notch G and lowers the latches at the forward end of the gate out of the recesses in the shoulders R R', so that the heavy rear end of the bar B will move down the inclined bar I, opening the gate in a direction from the operator. After the horse or vehicle has passed through the gateway the operator grasps and presses downward the outer end of the lever Q, which causes the rear end of the bar B to engage with the bent bar P and raise the forward end of the bar I, causing it to press back and pass the catch K. As the lever Q is released the rear end of the bar B moves down the inclined bar I, closing the gate. As the gate A comes into line with the gateway the rear part of the top bar, B, drops into the recess G, which raises the forward ends of the latches T T' into the recesses in the shoulders R R' of the latch-post S, fastening the gate shut.

Having thus fully described my invention, I claim as new and desire to secure by Letters Patent—

1. A gate constructed substantially as herein shown and described, and consisting of the gate A, the long weighted top bar, B, the pivot-post C, the recessed cross-bar F and its post, the tilting bars I, pivoted to the said cross-bar and moving in slots in the side posts, J, the spring-catches K, and the cords L and their supporting-bars M, and the lever Q, attached to the gate, as set forth.

2. In a gate, the combination, with the rearwardly-projecting weighted top bar, B, of the recessed cross-bar F, the tilting bars I, the slotted side posts, J, the spring-catches K, and the trip-cords L and their supporting-bars M, substantially as herein shown and described, whereby the gate can be opened by operating a trip-cord to drop the forward end of a tilting bar into an inclined position, as set forth.

3. The combination, with a gate provided with the rearwardly-projecting weighted top bar, B, and the lever Q, of the tilting bars I, having bent rods P, substantially as and for the purpose set forth.

4. The combination, with the weighted top bar, B, of the gate and the tilting bars I, of the roller H, substantially as herein shown and described, whereby the said top bar is made to move easily upon the said tilting bars, as set forth.

JOHN BLACKBURN WHITEMAN.

Witnesses:
  MAC MCCLARY,
  T. S. BURNETT.